Patented Jan. 14, 1930

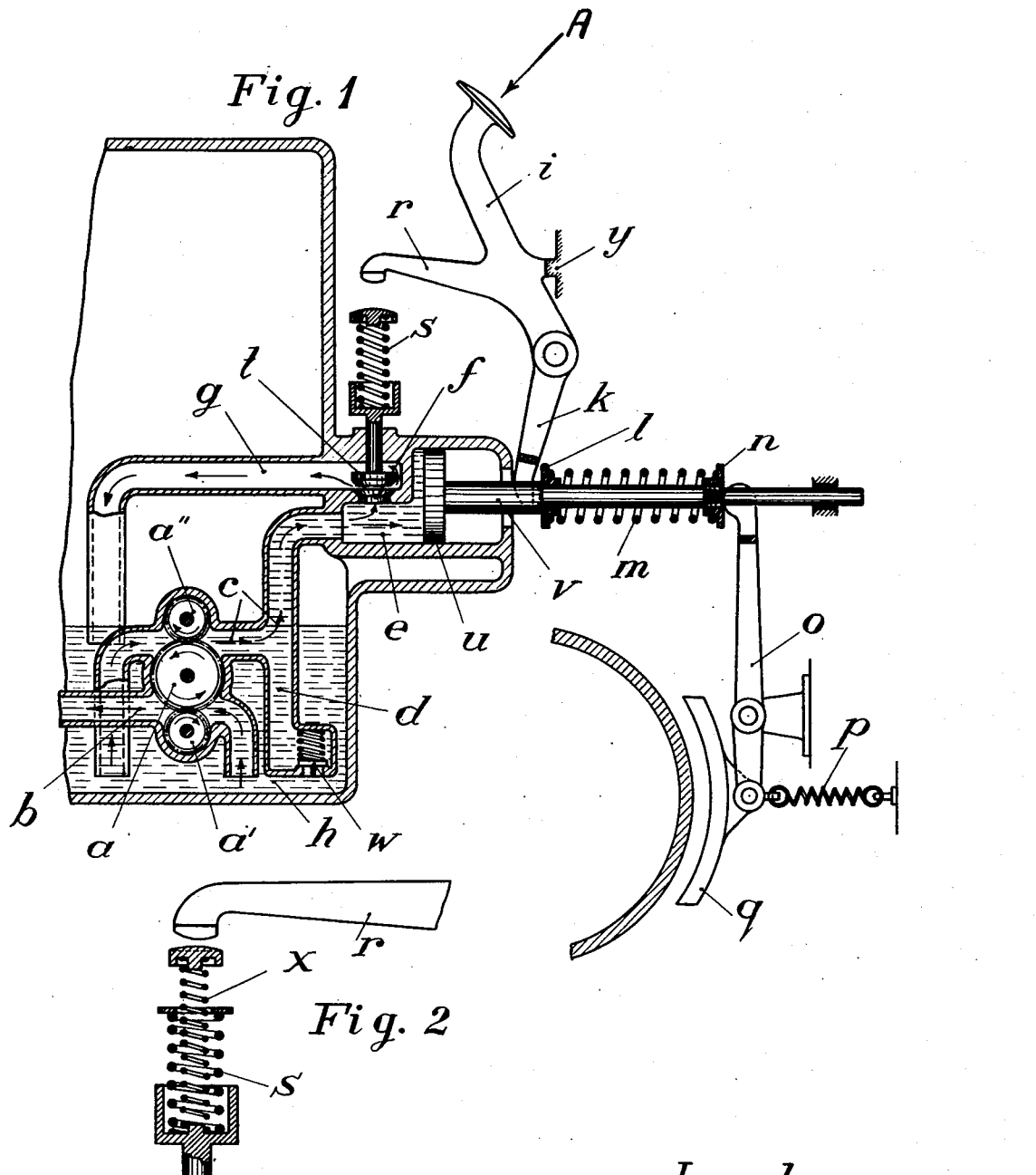

1,743,367

UNITED STATES PATENT OFFICE

KARL MAYBACH, OF FRIEDRICHSHAFEN, GERMANY, ASSIGNOR TO THE FIRM MAYBACH MOTORENBAU GESELLSCHAFT MIT BESCHRÄNKTER HAFTUNG, OF FRIEDRICHSHAFEN, GERMANY

DEVICE FOR ACTUATING THE BRAKES OF MOTOR VEHICLES

Application filed November 17, 1924, Serial No. 750,504, and in Germany December 22, 1923.

My invention relates to brakes of motor vehicles and more especially to brakes of this kind in which a hydraulic servo-motor is made use of.

Object of my invention is to provide for perfect sensitiveness of the operating means of combined brakes where direct pressure as well as pressure resulting from a servo-motor actuate the brakes. For this purpose, according to my invention, for a certain predetermined angle of the brake lever the braking stress is derived only from the lever, whereas on further inclination of the brake lever the servo-motor is put into operation thereby causing its auxiliary pressure also to act on the brakes. I prefer to have the direct application of the braking stress alone working up to approximately half the normal braking effect and the servo-motor to set in from this limit upward.

It will be of great advantage to the driver while applying the brakes gradually if the resistance he has to overcome also increases gradually. That is why I provide a spring with increasing resistance between the brake lever and the brake block in the controlling apparatus for direct operation. Furthermore the arrangement in combination with the servo-motor may be so that while direct application of the braking stress takes place the controlling device of the servo-motor allows for a gradual starting of this motor but this being only sufficient to overcome the normal resistances in the lever system and that of the necessary adjusting spring. In such cases where a pressure valve controls the servo-motor and where a spring is interposed between the brake lever and said valve the above mentioned end may be attained simply by interposing a second spring between lever and valve adapted to exert only low pressure on the valve sufficient to ascertain the above action whereas the other spring is stronger and is coming into operation only after the predetermined angle of the lever was covered, then effecting the main control of the servo-motor.

With a brake arrangement in accordance with my invention it is possible to create the hydraulic pressure necessary for operation of the servo-motor by means of the main engine of the vehicle, as there are brakes provided which can be operated independently from the servo-motor. Furthermore the liquid used in the servo-motor may be lubricating oil. This simplifies the whole arrangement.

Having given a general description of my invention I now want to point it out more in detail referring to the drawings which represent an example embodying my invention.

Fig. 1 is a diagrammatic longitudinal section through a device of the type described.

Fig. 2 is a portion of Fig. 1 on a larger scale showing a variation in the spring arrangement between the brake lever and the valve of the servo-motor.

In Fig. 1 brake lever $i$ has an arm $r$ adapted to press on spring $s$ and an arm $k$ adapted to press on spring $m$. Spring $m$ is situated on a rod forming continuation of piston rod $v$, to be mentioned later, and bears at one end against collar $l$ slidably mounted on said rod, at the other end it bears against collar $n$ rigidly connected to said rod. By means of lever $o$ the foot pressure exerted on lever $i$ in the direction of arrow A is transmitted to brake block $q$ passing over arm $k$, spring $m$, and collar $n$. Spring $p$ serves for withholding brake block $q$ from the wheel when the brake is not applied.

When arm $r$ presses on spring $s$ this pressure is transmitttd to valve $t$ which approaches seat $f$ thereby decreasing the cross section of the outlet of the liquid contained in cylinder $e$. While the engine of the vehicle is running this liquid is kept under constant pressure and is fed to cylinder $e$ from a revolving pump $a$ by means of wheel $a''$ in the direction of arrow $c$. This liquid in cylinder $e$ presses on piston $u$ after valve $t$ has been partially or totally closed thereby partially or totally preventing the liquid from escaping through outlet $f$ and returning through pipe $g$ to oil well $h$. Oil pressure on piston $u$ by means of rod $v$ and its continuation is transmitted to collar $n$ and therefrom to brake block $q$, thus causing a desired braking effect. Oil pump $a$ which is driven from the engine (not shown) in connection with a second wheel $a'$ feeds the lubricating oil to the engine. Furthermore in the piping $d$ arranged between oil pump $a$ and cylinder $e$ a suction valve $w$ is provided adapted to allow for a flowing in of oil from well $h$ in case of the engine being at rest and piston $u$ being moved to the right by foot pressure passing over arm $k$ and collar $n$ to piston rod $v$.

The operation of the mechanism is as follows:

Lever $i$ is pressed down by foot so that arm $k$ presses on collar $l$ and thereby under compression of spring $m$ acts on collar $n$ which by means of lever $o$ brings brake block $q$ to act. So long as arm $r$ does not touch spring $s$ the braking effect is exerted only by foot pressure. When lever $i$ is pressed down further so that arm $r$ presses on spring $s$ this causes valve $t$ which is held open by the pressure of the liquid from cylinder $e$ gradually to close. Thereby the increase of oil pressure in the cylinder $e$ causes piston $u$ to move to the right and over collar $n$ and lever $o$ also to act on the braking block $q$.

In Fig. 2 an additional weaker spring $x$ is provided between arm $r$ and valve $t$ for the purpose of ascertaining a gradual start of the servo-motor.

I do not want to limit myself to the details described or shown in the drawings as many variations will occur to those skilled in the art.

What I claim is:

1. A brake control system comprising a mechanical system for direct application of the braking stress to a brake; a brake lever for controlling said system; and a hydraulic servo-motor controlled by the same brake lever; comprising a cylinder, a piston in said cylinder, a piston rod projecting out of said cylinder, said cylinder having an opening adapted for letting in liquid under pressure, and having an outlet controlled by a valve; said valve being controlled by said brake lever; and said piston rod being connected to said mechanical brake system; said brake lever operating said valve only after said mechanical system has been working the brake to a pre-determined degree of braking effect.

2. A brake control system comprising a mechanical system for direct application of the braking stress to a brake; a brake lever for controlling said system and a hydraulic servo-motor controlled by the same brake lever; comprising a cylinder, a piston in said cylinder, a piston rod projecting out of said cylinder, said cylinder having an opening adapted for letting in liquid under pressure, and having an outlet controlled by a valve; said valve being controlled by said brake lever; and said piston rod being connected to said mechanical brake system, said connection allowing for operation of the brake from said servo-motor without influencing said mechanical system; said brake lever operating said valve only after said mechanical system has been working the brake to a pre-determined degree of braking effect.

In testimony whereof I affix my signature.

KARL MAYBACH.